(12) United States Patent
Twitchell et al.

(10) Patent No.: US 6,222,483 B1
(45) Date of Patent: Apr. 24, 2001

(54) GPS LOCATION FOR MOBILE PHONES USING THE INTERNET

(75) Inventors: Robert W. Twitchell; Andrew Taylor, both of San Diego, CA (US)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/163,221

(22) Filed: Sep. 29, 1998

(51) Int. Cl.[7] .................... G01S 5/02; H04B 7/185; H04Q 7/20
(52) U.S. Cl. .................. 342/357.09; 342/357.1; 455/456
(58) Field of Search .................. 342/357.06, 357.09, 342/357.1, 357.13, 450, 457; 455/456, 457, 426; 701/214

(56) References Cited

U.S. PATENT DOCUMENTS

| | | | |
|---|---|---|---|
| 5,043,736 | 8/1991 | Darnell et al. | 342/357 |
| 5,101,500 * | 3/1992 | Marui | 455/32.1 |
| 5,159,592 | 10/1992 | Perkins | 370/85.7 |
| 5,225,842 | 7/1993 | Brown et al. | 342/357 |
| 5,289,527 * | 2/1994 | Tiedemann, Jr. | 342/457 |
| 5,365,450 | 11/1994 | Schuchman et al. | 364/449 |
| 5,617,100 | 4/1997 | Akiyoski et al. | 342/357 |
| 5,663,734 | 9/1997 | Krasner | 342/357 |
| 5,752,218 | 5/1998 | Harrison et al. | 701/207 |
| 5,786,789 | 7/1998 | Janky | 342/357 |
| 5,841,396 * | 11/1998 | Krasner | 342/357.02 |
| 5,901,352 * | 5/1999 | St-Pierre et al. | 455/426 |
| 5,917,444 * | 6/1999 | Loomis et al. | 342/357.12 |

FOREIGN PATENT DOCUMENTS

| | | |
|---|---|---|
| WO 97/14054 | 4/1997 | (WO). |
| WO 98/25157 | 6/1998 | (WO). |
| WO 99/19743 | 4/1999 | (WO). |
| WO 99/44073 | 9/1999 | (WO). |

OTHER PUBLICATIONS

Valejo, A. et al., "Short–range DGPS for mobile robots with wireless Ethernet links", AMC '98–Coimbra, 1998 IEEE, pp. 334–339, XP–002127554.

* cited by examiner

Primary Examiner—Thomas H. Tarcza
Assistant Examiner—Fred H. Mull
(74) Attorney, Agent, or Firm—Perman & Green, LLP (57) ABSTRACT

A position locating system and method are provided for determining a geographic location of a portable remote unit. The locating system includes a communications system having at least one base station and a system controller. The base station bi-directionally couples the remote unit to the system controller through wireless links. The locating system also includes a server coupled to the system controller by a communication infrastructure external to the communications system. The server includes a data store which contains satellite positioning information. In response to a message from the remote unit, the server provides satellite information to the system controller over the communication infrastructure such that the provided satellite information is passed to the remote unit by the base station. The provided satellite information includes information to aid in acquiring a predetermined number of satellites within a satellite positioning system. The acquired satellites provide coded signals for determining the geographic location of the remote unit. In one embodiment, the data communication system is a cellular telephone network and the communication infrastructure is the Internet. The Internet is coupled to the cellular telephone network through a public switched telephone network (PSTN).

29 Claims, 7 Drawing Sheets

GPS LOCATION FOR MOBILE PHONES USING THE INTERNET

FIELD OF THE INVENTION

This invention relates to a system for determining a latitude and longitude of an individual or object, and specifically, to a system which includes a hand-held locating unit and a telecommunications network which includes a radiotelephone network, a satellite positioning system and the Internet.

BACKGROUND OF THE INVENTION

Presently, position locating systems may include a portable remote unit which comprises a receiver for receiving signals from a satellite positioning system (e.g., a global positioning system (GPS)), telecommunications circuitry, clock circuitry and a microprocessor for analyzing coded signals received from the satellite positioning system and from a telecommunications link, for example, a wireless communication network. The microprocessor of this integrated positioning and telecommunications system may analyze the coded signals to determine the latitude and longitude of the portable remote unit. An exemplary integrated positioning and telecommunications system can be found in, for example, U.S. Pat. No. 5,043,736, issued Aug. 27, 1991, entitled "Cellular Position Locating System", by Darnell et al., which discloses a portable locating unit useful both as a cellular telephone and a portable global positioning system.

The determination of the position of the remote unit may be calculated with, or without, information provided to the remote unit over the telecommunications link, e.g., over the wireless communication network.

In one type of a GPS system, which operates without information provided over the telecommunications link, the precise position of each of a plurality of satellites at any given time are transmitted to the Earth in the form of coded signals. The coded signals contain information as to the position of each of the satellites in space with respect to GPS time, and also, an indication of the precise time at which each one of the signals was transmitted from each one of the satellites. This information may be referred to as ephemeris data. The coded signals also include high rate repetitive signals referred to as pseudorandom (PN) sequences. Each GPS satellite broadcasts a signal with a unique offset to a PN sequence.

The coded signals are transmitted by the GPS satellites within a predetermined band of frequencies. The remote units search the predetermined band of frequencies in an effort to acquire the coded signals from in-view GPS satellites. In the acquisition process, a remote unit receives signals from the GPS satellites and performs a correlation operation. The correlation operation evaluates the received signals and searches for known PN sequences. The detection of a known PN sequence within a received signal is an indication that the received signal is a GPS coded signal. Once the PN sequence search is complete and a coded signal is acquired, the range or distance between the GPS satellite transmitting the signal and a receiver, e.g. the remote unit, may be determined. The distance is determined by using the time of transmission of the coded signal and by noting the time that the signal is received at the remote unit from one of the satellites. The remote unit calculates a propagation time delay from the time difference, i.e. from the difference between the time the coded signal was transmitted and the time the signal was received at the remote unit. The calculated time delay, when multiplied by the speed of propagation of the signal, provides the range or distance value, referred to as a "pseudorange", between the transmitting satellite and the remote unit. The distance is referred to as a "pseudorange" because, while the actual calculation may be accurate, errors may be introduced in the data by the fact, e.g., that a local clock, which is generated in the remote unit, may not be precisely synchronized with GPS time, and also by the fact that signal propagation through the atmosphere may encounter delays.

Once the pseudorange computations are completed, the position of the remote unit is determined by using the pseudoranges and the satellite timing and ephemeris data. Typically, GPS signals from at least two or three line-of-sight positioning satellites are needed to supply sufficient information to derive accurate position determinations at an Earth-based station, such as the remote unit. Conventionally four such satellites are used to determine a terrestrial position estimate, three for triangulation and one for correcting for clock bias.

In another type of a GPS system, the position of the remote unit is determined by utilizing the positioning signals received from in-view satellites (as described above) and also satellite information received over a telecommunications link from a base station. The telecommunications link may be, for example, a two-way page system or a cellular communication system. Accordingly, the remote unit utilizes the information received from the GPS satellites and from the telecommunications link to compute pseudoranges and, in turn, to compute its latitudinal and longitudinal position. An exemplary embodiment of a position locating systems which utilizes positioning signals received from in-view satellites and satellite information received over a data communication link can be found in U.S. Pat. No. 5,663,734, issued Sep. 2, 1997, entitled "GPS Receiver and Method For Processing GPS Signals", by Norman F. Krasner. Similar systems are also disclosed in U.S. Pat. No. 5,225,842, issued Jul. 6, 1993, entitled "Vehicle Tracking System Employing Global Positioning System (GPS) Satellites", by Brown et al. and in U.S. Pat. No. 5,365,450, issued Nov. 15, 1994, entitled "Hybrid GPS/Data Line Unit For Rapid, Precise, and Robust Position Determination", by Schuchman et al.

In Schuchman et al., for example, there is disclosed a specialized server which resides on a cellular phone system. The specialized server includes a satellite almanac database which contains ephemeris and time models of a GPS satellite constellation. In one embodiment, the ephemerides and time model information is provided to the GPS receiver for use in a search and acquisition mode.

Figure 1:
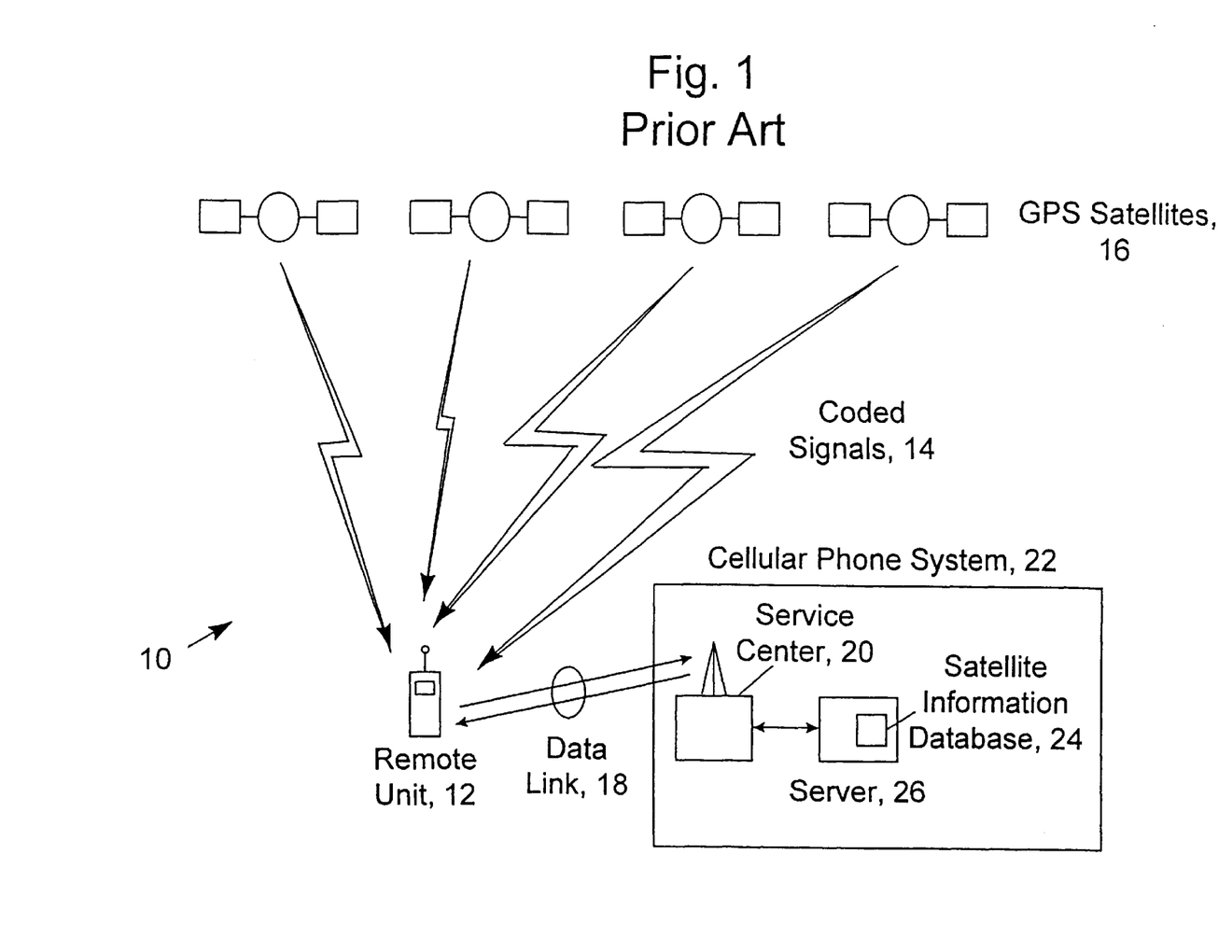
FIG. 1 is schematic diagram of a conventional GPS locating system which utilizes satellite ephemeris data in an acquisition mode.

In FIG. 1, a conventional GPS locating system 10 is shown. A remote unit 12 of the GPS locating system 10 searches a predetermined band of frequencies to acquire coded signals 14 transmitted by orbiting GPS satellites 16. The remote unit 12 also establishes communication, via data link 18, with a service center 20 which services a region of a cellular phone system 22. The cellular phone system 22 includes a satellite information database 24 which contains ephemerides and timing data for the GPS satellites 16 within a GPS satellite constellation.

The remote unit 12 of this conventional GPS locating system 10 uses the coded signals 14 and ephemeris and timing data to determine the latitudinal and longitudinal position of the remote unit 12. The remote unit 12 also uses the data from the satellite information database 24 to aid its search for in-view GPS satellites 16 of the GPS constellation. A prior knowledge of the location of the GPS satellites 16 can decrease the time required to acquire the coded signals 14 from the GPS satellites 16.

The satellite information database 24 is stored in a specialized server 26 of the cellular phone system 22. Thus, the ephemerides and timing data of the GPS satellites 16 can be requested by the remote unit 12, retrieved from the satellite information database 24, and passed by the cellular phone system 22 through the service center 20 over data link 18 to the requesting remote unit 12. The received ephemerides and timing data can then be used, with the received coded signals 14, to determine the latitude and longitude of the remote unit 12.

As can be appreciated, delays may be experienced in this process of requesting and receiving data from the satellite information data base 24 of the cellular phone system 22. For example, delays in the transmission of a request for data by the remote unit 12, the reception and processing of the request in the cellular phone system 22, and the retrieval and transmission of data from the satellite information data base 24 back to the remote unit 12, may compromise the validity of the information provided. That is, the delays may result in the remote unit 12 receiving information that a GPS satellite is at a first position when, in fact, the GPS satellite has passed the first position and is in a second position. Under these circumstances the attempt to aid the search for in-view satellites has failed and may have increased the actual acquisition time.

As demonstrated above, the ability of a remote station to rapidly locate, track and acquire position information from in-view, earth orbiting GPS satellites is desirable. Satellite ephemerides and timing information can be provided to aid the acquisition process. While it is also desirable to achieve the goal of rapid acquisition and tracking, it is undesirable to provide a specialized server in a radiotelephone system to accomplish the goal.

OBJECTS AND ADVANTAGES OF THE INVENTION

It is therefore a first object and advantage of this invention to provide a method and a system to enhance the ability of a remote unit to locate, track and acquire the position information from GPS satellites while avoiding the necessity to provide a specialized GPS server in a radiotelephone system.

It is a further object and advantage of this invention to provide satellite ephemerides data, prior to acquisition, to aid a remote unit in rapidly locating and acquiring in-view, GPS satellites, the ephemerides being provided from a server that is coupled to the radiotelephone system through a communication network external to the radiotelephone system such as the Internet.

It is another object and advantage of this invention to provide satellite ephemerides data from a single server that is coupled to one or more radiotelephone systems through a communication network external to the one or more radiotelephone systems, the one or more radiotelephone systems being coupled directly or indirectly to the external communication network.

It is still another object and advantage of this invention to time stamp messages requesting satellite ephemerides data and messages providing the requested ephemerides data to indicate a quality of the received ephemerides data, and also to aid a remote unit in locating and acquiring in-view, GPS satellites.

Further objects and advantages of this invention will become more apparent from a consideration of the drawings and ensuing description.

SUMMARY OF THE INVENTION

The foregoing and other problems are overcome and the objects and advantages are realized by methods and apparatus in accordance with embodiments of this invention, wherein a system and methods for locating and acquiring GPS satellites used to determine a precise latitude and longitude of a remote unit are disclosed.

A position locating system for determining a geographic location of a portable remote unit includes a telecommunications system having at least one base station and a system controller. The base station bi-directionally couples the remote unit to the system controller through wireless links. The locating system also includes a server coupled to the system controller by a communication network infrastructure external to the telecommunications system. The server includes a data store which contains satellite positioning information. In response to a request for satellite information, the server provides satellite information to the system controller over the communication network infrastructure such that the provided satellite information is passed to the remote unit by the base station. The provided satellite information includes information to aid in acquiring a predetermined number of satellites within a satellite coded system. The acquired satellites provide coded signals that are utilized to determine the geographic location of the remote unit. The selected satellites represent GPS satellites in-view of the base station as determined from the requested satellite information.

In one embodiment, the telecommunications system is a cellular telephone network and the communication network infrastructure is the Internet which is coupled to the cellular telephone network through a public switched telephone network (PSTN). In another embodiment, the communication network infrastructure is directly coupled to the cellular telephone network.

Also disclosed is a method for determining a geographic location of a portable remote unit. The method includes the steps of: (a) providing a telecommunication system comprising at least one base station and a system controller, the at least one base station bi-directionally coupling the remote unit to the system controller through wireless links; (b) requesting satellite information from a server coupled to the system controller by a communications network infrastructure external to the telecommunications system; (c) in reply to the request, retrieving the requested satellite information from the server; (d) providing the retrieved satellite information to the remote unit; and (e) acquiring a predetermined number of satellites of a satellite positioning system in accordance with the provided satellite information, wherein the acquired satellites provide coded signals for determining the geographic location of the remote unit.

In one embodiment, the satellite information provided to the remote unit may include, for example, satellite almanac, ephemeris, and timing information, as well as information that specifies which satellites are expected to be in-view and their expected signal strengths (pseudorange corrections).

BRIEF DESCRIPTION OF THE DRAWINGS

The above set forth and other features of the invention are made more apparent in the ensuing Detailed Description of the Invention when read in conjunction with the attached Drawings, wherein.

Identically labelled elements appearing in different ones of the above described figures refer to the same elements but may not be referenced in the description for all figures.

DETAILED DESCRIPTION OF THE INVENTION

Figure 2:
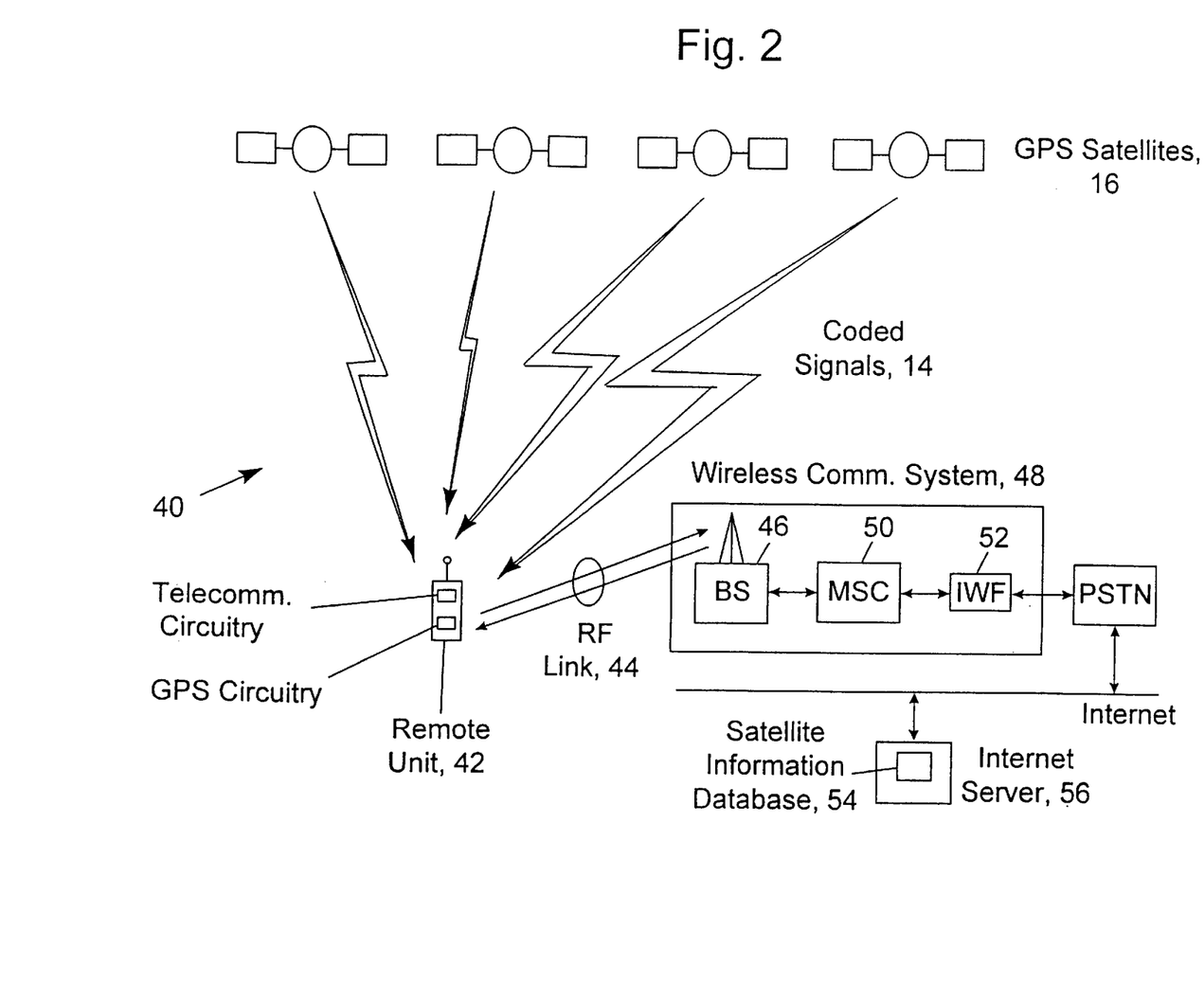
FIG. 2 is schematic diagram of an integrated GPS locating and telecommunications system in accordance with the present invention.
Figure 3:
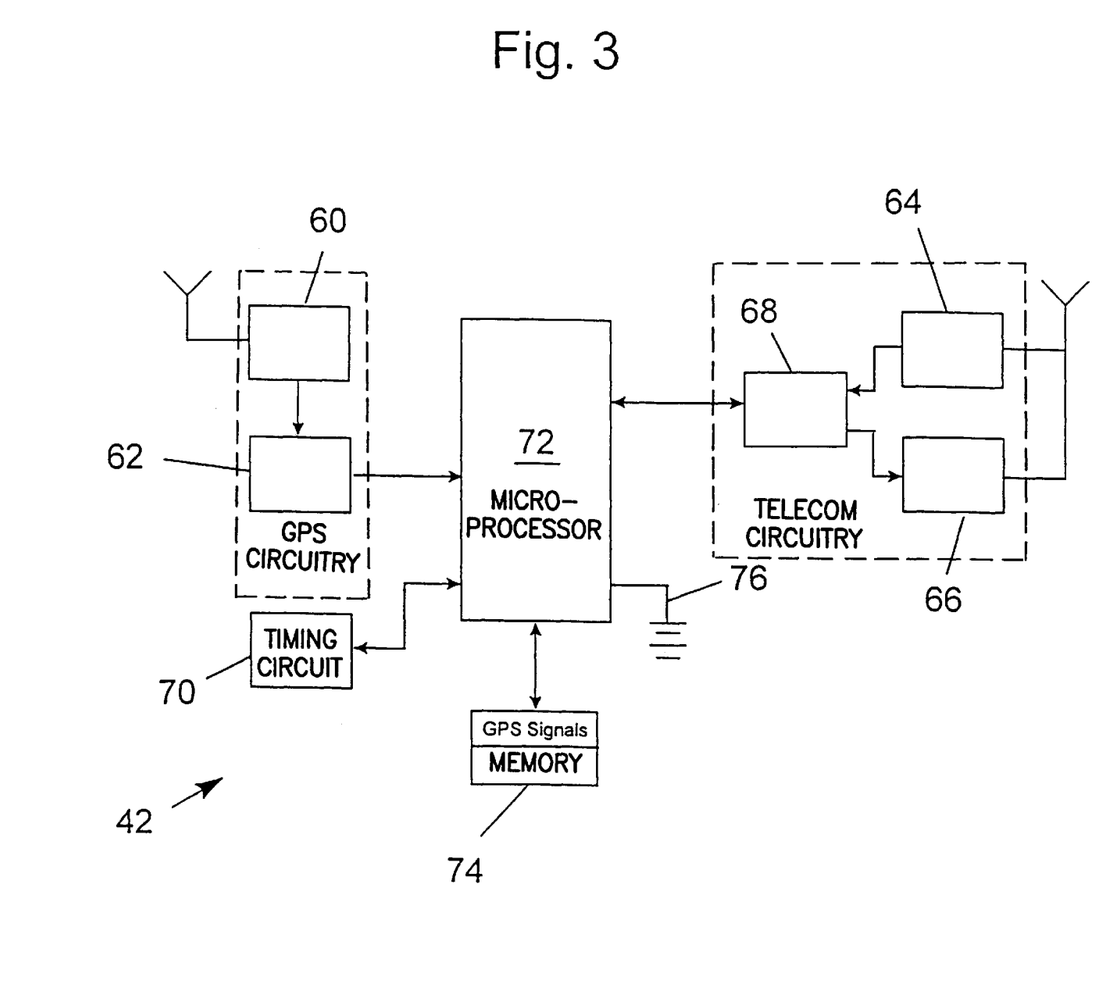
FIG. 3 is schematic diagram of a remote unit of the integrated GPS locating and telecommunications system of FIG. 2.

Referring to FIGS. 2 and 3, and accordance with the present invention, an integrated GPS locating and telecommunications system 40 is shown. A remote unit 42 of the integrated system 40 includes GPS circuitry (60, 62) for receiving signals from a QPS satellite positioning system, telecommunications circuitry (64, 66 and 68) for supporting the transmission and the reception of RF signals over a telecommunications link, e.g. a RF link 44 between the remote unit 42 and a base station 46 of a wireless communications network 48. The GPS (60, 62) and telecommunications circuitry (64, 66 and 68) enables the remote unit 42 to function as a combined portable GPS receiver and a mobile radiotelephone.

It should be appreciated that the wireless communications system 48 can be, for example, a cellular telephone network, a personal communication services (PCS) system, a paging network and a trunked dispatch communications system such as a fleet dispatched service (e.g., a police or other safety agency communications service that requires communications within a group of mobile users).

The remote unit 42 further includes timing circuitry 70 and a microprocessor 72 for analyzing coded signals received from the GPS satellite system and from the wireless communications network 48. The remote unit 42 also includes a memory 74 for storing system parameters such as, for example, previously received GPS signals and a plurality of constants and variables that are used by the microprocessor 72 during the operation of the integrated GPS receiver and mobile wireless communications device such as the mobile radiotelephone. For example, the memory 74 stores the values of various radiotelephone system parameters (e.g., cellular system parameters and a number assignment module (NAM)). An operating program for controlling the operation of microprocessor 72 is also stored in a portion of the memory 74 (typically in a ROM device).

The telecommunications circuit 68 includes a modulator, a demodulator, a user interface such as a conventional earphone or speaker, a conventional microphone, a display, and a user input device, typically a keypad, all of which are coupled to the microprocessor 72. The remote unit 42 may also include a battery 76 for powering the various circuits that are required to operate the remote unit 42, or alternatively, include circuitry to enable the remote unit 42 to be vehicle mounted.

It should therefore be understood that the remote unit 42 can be a vehicle mounted or a handheld device. It should further be appreciated that when operating as a mobile radiotelephone the remote unit 42 may be capable of operating with one or more air interface standards, modulation types, and access types. By example, the remote unit 42 may be capable of operating with any of a number air interface standards such as IS-136, GSM and IS-95 (CDMA). It should thus be clear that the teaching of this invention is not to be construed to be limited to any one particular type of mobile radiotelephone or air interface standard.

In accordance with the present invention, the microprocessor 72 of this integrated positioning and telecommunications system 40 analyzes the received, coded signals to determine the latitude and longitude of the remote unit 42.

As shown in FIG. 2, the base station 46 is a part of the wireless communications network 48 which comprises a mobile switching center (MSC) 50 and an Interworking function (IWF) 52. The MSC 50 and the IWF 52 provide a connection to landline trunks when the remote unit 42 is involved in a call. The MSC 50 and the IWF 52 also provide a connection between the remote unit 42 and a communication network infrastructure external to the wireless communications system 48. In a preferred embodiment of the present invention, the communication network infrastructure is the Internet. As such, the MSC 50 and the IWF 52 provide a connection between the remote unit 42 and the Internet via the PSTN or some other network. In one embodiment, the IWF 52 includes an Internet communication interface. In another embodiment, the IWF 52 is directly connected to the Internet and, thus, does not interface with the PSTN.

As used herein, the expression the "Internet" refers to an infrastructure whose protocols and operating rules effectively permits the creation of a world-wide "network of networks." By connecting a computing device to the Internet, graphic and textual data may be requested and received by the computing device from any source also connected to the Internet. Thus, a matrix of interconnected communication devices, which have the ability to exchange information between one another, is formed.

In general, devices connected to the Internet will adhere to TCP/IP protocols. Traditionally, fiber optics, wires, cables, switches, routers and other communications technologies connect individual computing devices over the public switched telephone network (PSTN), or directly, to the Internet. Once connected, the individual computing device becomes "linked" to the other communicating devices on the Internet such that there is a perception that there is no physical distance between any of the devices. That is, whether a device is physically located next the commuting device or on another continent the devices function as if they are physically connected.

Therefore, and in accordance with the present invention, GPS satellite information, for example ephemerides and timing data, stored in a satellite information database 54 on an Internet server 56 is available to one or more telecommunications systems having access, either directly or indirectly, to the Internet. Upon request, at a predetermined time or at an occurrence of a predefined event, the Internet server 56 provides the GPS satellite information, i.e. the ephemeris and timing data, to the wireless communications system 48, over the PSTN or directly thereto, for transmission to the remote unit 42 over the RF link 44. It can be appreciated that many wireless telecommunications systems, i.e. systems operated by numerous wireless service providers, can access the satellite information database 54 via the Internet interface. As such, the complexity of providing the conventional specialized GPS server in each telecommunications system is avoided.

Additionally, the storing of the GPS satellite ephemerides and the timing data in the satellite information database 54 on the communication network infrastructure external to the wireless communications system 48, i.e. the Internet server 56, provides a flexible method of transferring data between the remote units and the satellite information database 54. Accordingly, as a mobile radiotelephone user roams to networks operated by different wireless service providers the GPS data is accessible as long as a current service provider can access the external communication infrastructure. For example, it can be appreciated that wireless service providers (e.g., cellular service providers) may employ one or more bearer services, such as Short Message Service (SMS), IS-707 circuit data, and IS-707 packet data, as a base station to remote unit communication protocol. As a mobile radiotelephone user moves from a "home" service provider which employs, for example, a SMS bearer service to another service provider which supports circuit switched data or packet data, the GPS positioning data which was accessed by the mobile radiotelephone user in the home service provider may be accessed in the circuit switched data provider as long as the circuit switched data provider permits the mobile radiotelephone user to access the Internet. By implementing GPS positioning using an Internet server, there is no need for each service provider (the SMS or the circuit switched data provider) to actively support GPS positioning, or for each service provider to maintain a specialized server which supports GPS positioning. Furthermore, a third party such as, for example, an Internet Service Provider, could establish and maintain a centralized GPS positioning server on the Internet and make the server available to mobile radiotelephone users using a number of mobile telephone networks.

Figure 4A:
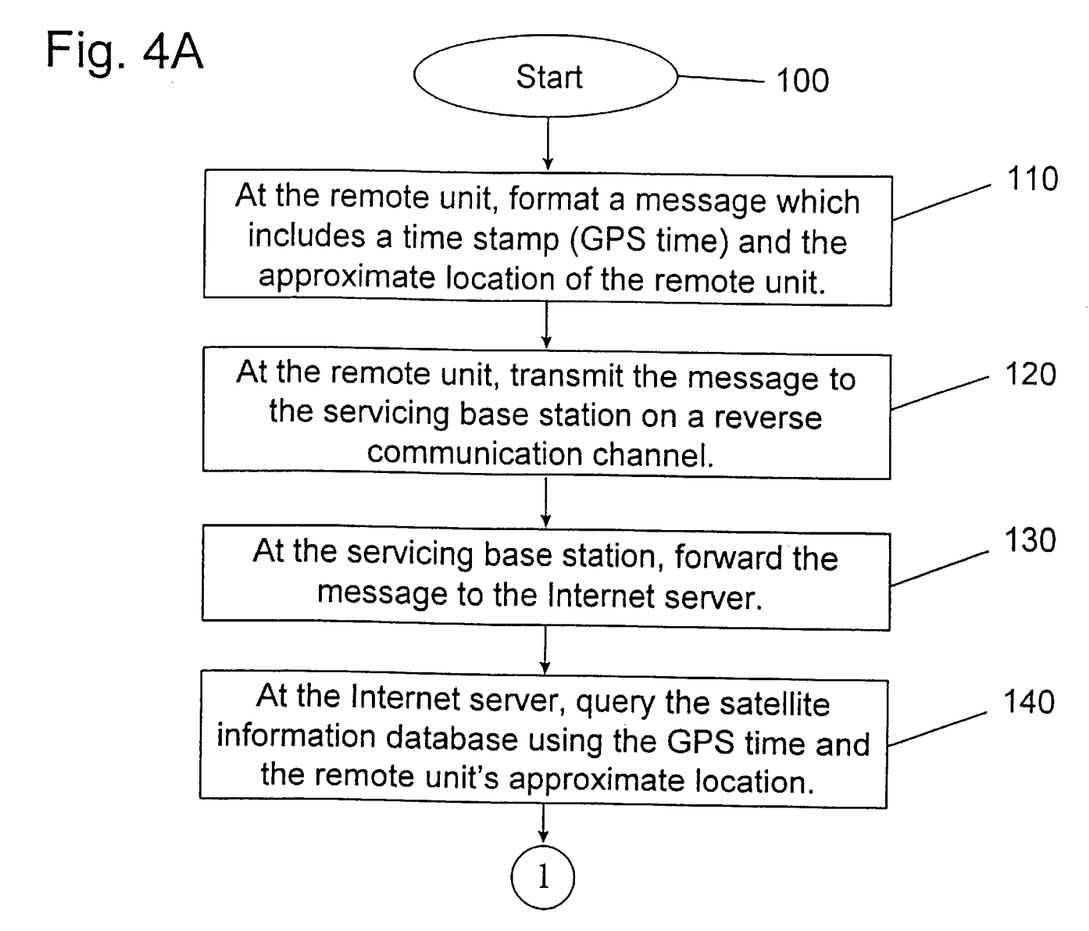
FIGS. 4A and 4B are flowcharts illustrating the integrated GPS locating and telecommunications system's use of satellite information.
Figure 4B:
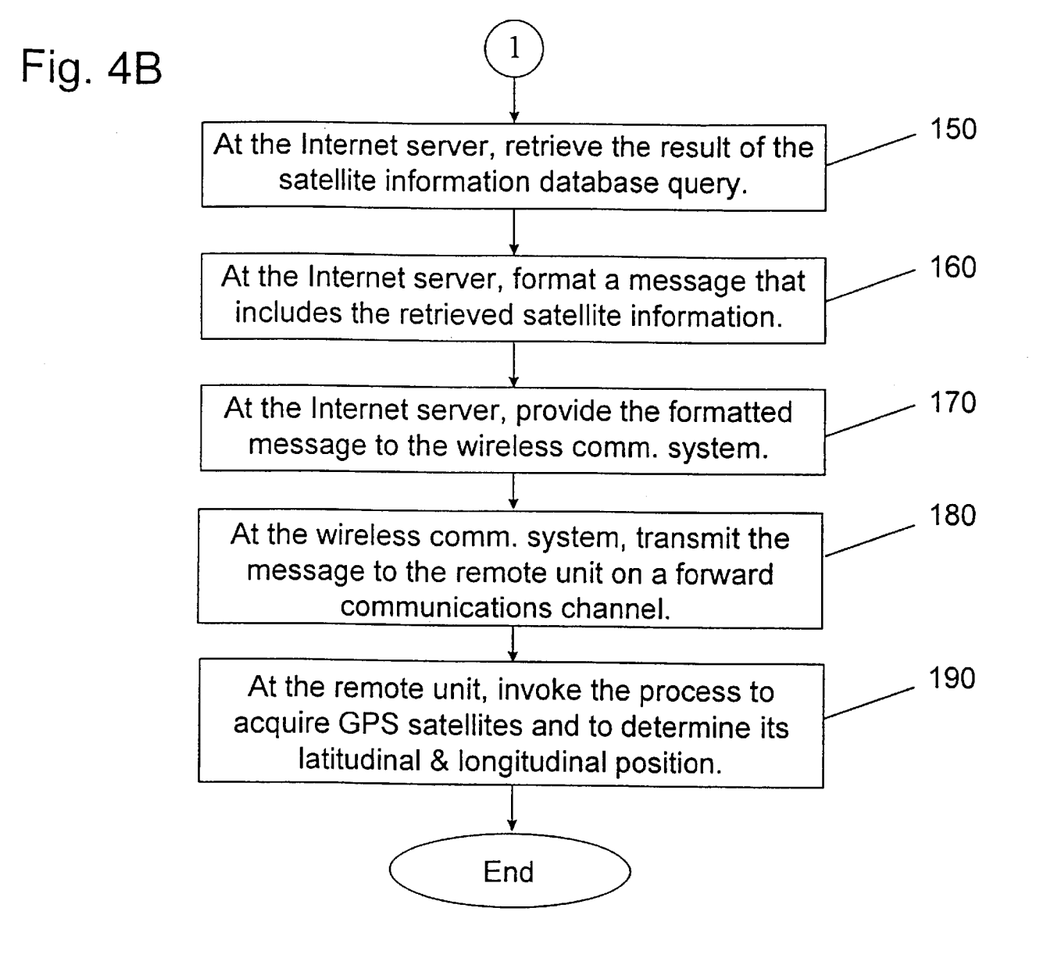

FIGS. 4A and 4B illustrate an algorithm for determining the latitude and longitude of a remote unit, e.g., the remote unit 42. In FIG. 4A, the algorithm for determining the latitude and longitude of the remote unit 42 begins at Block 100. At Block 110, the remote unit 42 formats a message which includes a time stamp and an approximate location of the remote unit 42. Preferably, the time stamp is the GPS time while the approximate location of the remote unit is determined according to one of the following methods.

Since a base station that services the remote units operating within a predetermined region, or cell, of the wireless telecommunications network is at a fixed location, the base station's latitude and longitude are known. In some cellular networks, for example a CDMA network, the base station's latitude and longitude, and a GPS time are provided to the remote units operating within the cell. Therefore, in wireless networks which provide the base station's latitude and longitude and the GPS time to the remote units the approximate location field and the time stamp field of the message formatted by these remote units contains the base station's known latitude and longitude, and the GPS time.

However, in wireless networks which do not provide the base station's latitude and longitude or the GPS time to the remote units, the approximate location field and the time stamp field of the message formatted by the remote units contain other information that provides a less precise initial location of and time stamp for the remote unit, for example, the network's System ID (SID) and a value from a real time system clock of the remote unit. In some cellular networks all base stations within a specific geographic region, e.g. a city, have an equivalent SID value. Since multiple base stations share equivalent SID values, a less precise initial location of a remote unit is included in the message formatted by the remote unit. While providing a less precise remote unit location than is possible when transmitting the base station's known latitude and longitude, the SID value provides some bounds on the possible location of the remote unit.

At Block 120, the message is transmitted from the remote unit 42 to the base station 46 servicing the remote unit 42 on a reverse communication channel of the RF link 44.

Figure 6:
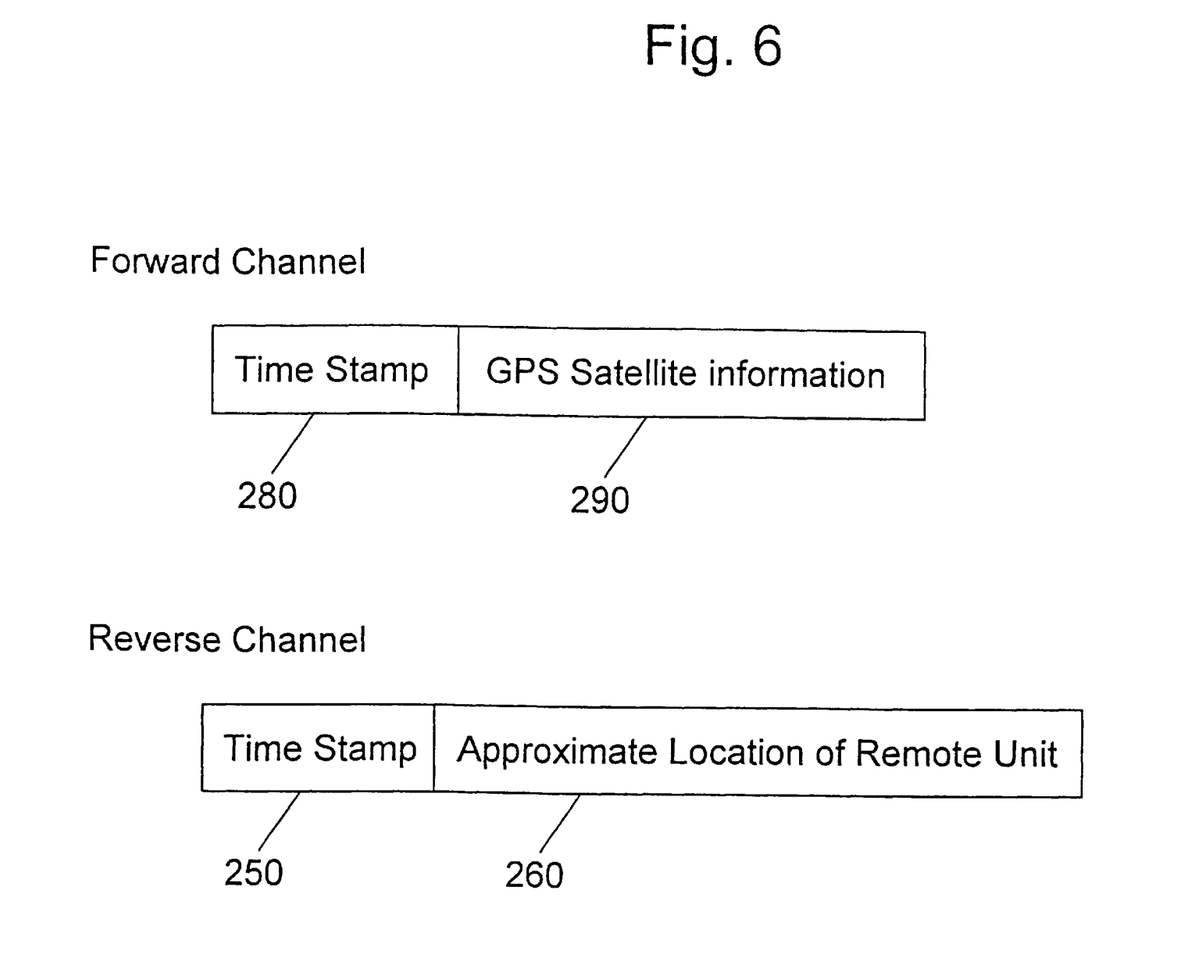
FIG. 6 is a schematic diagram of a reverse communication channel request for a satellite information message and a forward communication channel message for providing the requested satellite information.

Referring briefly to FIG. 6, one embodiment of a message from a remote unit to a servicing base station over a reverse communication channel is shown. The formatted message includes a first field 250 and a second field 260 which each contain a value representing a time stamp (e.g., the GPS time) and the approximate address of the remote unit (e.g., either the latitude and the longitude of the servicing base station or the SID of the servicing base station), respectively.

Once again referring to FIG. 4A, at Block 130, the servicing base station 46 receives the message on the reverse communication channel and passes the message to the MSC 50 for processing. The MSC 50 processes the message by accessing the Internet server 56, through the IWF 52 and the PSTN. When the message is received at the Internet server 56, the satellite information database 54 is queried. This data base query, occurring at Block 140, utilizes the GPS time and the approximate location of the remote unit 42 to identify those GPS satellites 16 in-view of the base station 46, and thus, the remote unit 42. At Block 150 (FIG. 4B), the result of the database query is retrieved and, at Block 160, a message containing the retrieved results is formatted.

Referring once again briefly to FIG. 6, there is shown one embodiment of a message containing the retrieved query results, i.e. the satellite information from the database 54 of the Internet server 56 which is sent to the remote unit 42 over a forward communication channel. The formatted message includes a first field 280 and second fields 290. The first field contains a value representing a time stamp. The second fields 290 contain values representing the retrieved satellite information from the database 54. For example, the retrieved satellite information may include GPS satellite almanac, ephemerides and timing data as well as data representing velocity vectors, data representing an indication of which satellites are expected to be in-view and expected signal strengths (pseudorange corrections).

The time stamp is affixed to the retrieved query results message so that a time offset can be generated when the query results are received at the remote unit 42. The time offset is used to improve the accuracy of the computations performed at the remote unit 42, i.e. to improve the determination of which GPS satellites are in-view. For example, it can be appreciated that a delay may be experienced as data is transmitted from one location, i.e. the remote unit 42, over a network to another location, i.e. the Internet server 56. During the time period of the delay, the GPS satellites 16 and possibly the remote unit 42 are moving. Therefore, by time stamping the messages transmitted over the network the adverse effects of the network delays on the computations can be minimized.

In one embodiment, the Internet server 56 may evaluate the time stamp affixed to the message received from the remote unit 42 to estimate a delay over the network. The Internet server 56 may then use the estimated delay to determine the time required for a transmission of data back to the remote unit 42. As a result of this calculation the Internet server 56 may, for example, perform its data base query and the subsequent retrieval of satellite information to account for the estimated delay in the transmission of the Internet server's message back to the remote unit 42. That is, satellite information is retrieved so that it is as current as possible, based on the estimated delay, when the information is received by the remote unit 42. Similarly, the remote unit 42 may evaluate the satellite information received from the Internet server 56 and the time stamp affixed thereto. If, for example, a significant time delay is noted from the receipt of the satellite information and the time the Internet server 56 transmitted the information, i.e. affixed the time stamp, the remote unit 42 may ignore the information and make another request for data or, alternatively, modify the received satellite information before use. By anticipating and/or detecting the network delay a potentially more precise computation of the remote unit's latitude and longitude may be realized.

At Block 170 of FIG. 42, the formatted message containing the retrieved satellite information is provided to the wireless communications system 48 through the PSTN. At Block 180, the wireless communications system 48 transmits the message to the requesting remote unit 42 over the forward communication channel of the RF link 44. At Block 190, once received at the remote unit 42 the requested satellite information is utilized to locate and acquire coded signals 14 of in-view GPS satellites 16 and then to determine an accurate position of the remote unit 42. It should be appreciated that the time for acquisition of the coded signals 14 from orbiting GPS satellites 16 is reduced since satellite ephemerides and timing data provides a prior knowledge of in-view GPS satellites 16. This process is discussed in detail below with reference to an algorithm illustrated in FIG. 5.

Figure 5:
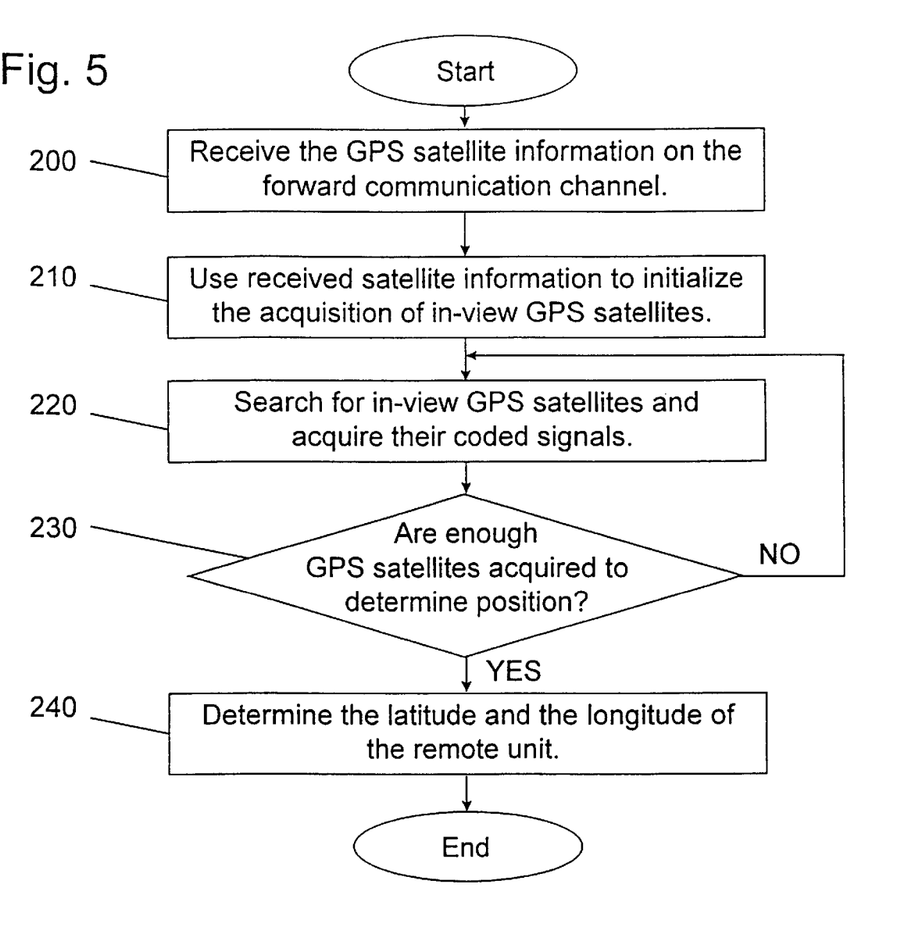
FIG. 5 is a flowchart illustrating a remote unit's use of satellite information to facilitate the acquisition of in-view GPS satellites to determine its position.

In FIG. 5, the remote unit 42 receives the satellite information from the satellite information database 54. For example, the remote unit 42 receives satellite ephemerides and timing data particular to those GPS satellites 16 determined to be in-view of the base station 46 and thus, also in-view of the remote unit 42. At Block 200 the satellite information is received at the remote unit 42 on the forward communication channel from the base station 46. At Block 210, the remote unit 42 utilizes the received satellite information to initialize an acquisition process which, as described above, searches the PN sequences of received signals so as to acquire coded signals 14 from in-view GPS satellites 16. At Block 220, the search continues until enough GPS satellites 16 are located to provide satisfactory data to determine the precise location of the remote unit 42. That is, at Block 230, the number of acquired GPS satellites 16 is compared to a predetermined number of, for example, four GPS satellites. If four GPS satellites have not yet been acquired, then a "NO" path of the algorithm is followed and the search for in-view GPS satellites continues at Block 220. If, however, enough satellites have been located to determine the remote unit's location, then a "YES" path of the algorithm is followed and the determination of the precise position of the remote unit 42 can be determined according to conventional means. That is, at Block 240 the coded signals 14 from the acquired GPS satellites and the satellite information, i.e. the ephemeris and timing data, are utilized to determine a precise latitude and longitude of the remote unit 42.

As noted above, a prior knowledge of the location of in-view GPS satellites 16 can decrease the time required to acquire the coded signals 14 from the GPS satellites 16 and can increase the remote unit's sensitivity. A perceived disadvantage of conventional methods of providing the prior knowledge is avoided in the instant invention, since the source of the GPS satellite information is implemented outside the wireless communications network. By removing the satellite information database from the wireless communications network, while still maintaining accessibility over a communication network such as the Internet, the present invention bypasses the need for wireless communications network standardization across many wireless service providers, and furthermore simplifies the wireless telecommunications system.

Additionally, the present invention improves the accuracy and validity of the GPS satellite information by employing a time offset which is used to minimize the adverse effects of network delays experienced when transmitting the GPS satellite information to a requesting remote unit. As described above, by anticipating the network delay a potentially more precise computation of a remote unit's latitude and longitude may be realized. The time offset may also be used to determine the validity of the GPS satellite information. That is, if a significant delay or offset is detected between the request for, transmission of, or the receipt of the satellite information, then the information may be ignored and a new request made or, alternatively, the satellite information may be modified before use.

Although described in the context of preferred embodiments, it should be realized that a number of modifications to these teachings may occur to one skilled in the art. By example, the teachings of this invention are not intended to be limited to any specific communication protocol. That is, the Internet interface may readily be replaced with a similarly universal communication platform which permits access to satellite information to many wireless communications service providers. Furthermore, the wireless telecommunications network with which the remote unit communicates may not be a "cellular" network per se.

It should also be appreciated that the teachings of the present invention can be applied as well to wireline communication devices. In accordance with the present invention, information retrieved from a centralized GPS satellite database is passed over a communication platform such as the Internet to the data communications network which includes the wireline device. As such, the sensitivity and accuracy of the GPS system within the wireline device are improved.

Thus, while the invention has been particularly shown and described with respect to preferred embodiments thereof, it will be understood by those skilled in the art that changes in form and details may be made therein without departing from the scope and spirit of the invention.

What is claimed is:

1. A position locating system for determining a geographic location of a portable remote unit, comprising:

a communications system comprising at least one base station and a system controller, said at least one base station for bi-directionally coupling said remote unit to said system controller through wireless links; and a server coupled to said system controller by a communication infrastructure external to said communications system, said server comprising a data store which contains satellite information for a satellite positioning system;

means for transmitting a message from said remote unit to said at least one base station, wherein said message includes a time stamp indicating a time said message is transmitted;

wherein in response to said message from said remote unit, said server provides satellite information to said system controller over said communication infrastructure such that said provided satellite information is passed to said remote unit by said at least one base station;

wherein said provided satellite information comprises information to aid in acquiring a predetermined number of satellites, said acquired satellites providing coded signals for determining said geographic location of said remote unit; and wherein said server further comprises means for evaluating said time stamp to determine a time delay between said time stamp and a time said message from said remote unit was received, said server providing said satellite information in accordance with said time delay such that said provided satellite information represents said satellites at a time said provided satellite information is received at said remote unit.

2. The position locating system as set forth in claim 1, wherein said communication system is comprised of a cellular telephone network.

3. The position locating system as set forth in claim 2, wherein said communication infrastructure is comprised of the Internet which is coupled to said cellular telephone network through a public switched telephone network (PSTN).

4. The position locating system as set forth in claim 1, wherein said remote unit is comprised of an integrated portable global positioning system (GPS) receiver and a mobile radiotelephone.

5. The position locating system as set forth in claim 1, wherein said remote unit comprises:

means for receiving said satellite information provided by said at least one base station;

processing means for analyzing said provided satellite information and for acquiring said predetermined number of satellites, wherein said acquired satellites comprise satellites in-view of said at least one base station as determined from said provided satellite information; and means for receiving coded signals from each of said acquired positioning satellites.

6. The position locating system as set forth in claim 5, wherein said received satellite information includes a second time stamp indicating when said received satellite information was transmitted from said server, and wherein said processing means analyzes said second time stamp to determine a characteristic of said received satellite information.

7. The position locating system as set forth in claim 5, wherein said message from said remote unit further comprises a value representing an approximate location of said remote unit.

8. The position locating system as set forth in claim 7, wherein said approximate location of said remote unit is comprised of one of a latitude and a longitude of said at least one base station which is servicing said remote unit, and a System ID (SID) of said communication system.

9. The position locating system as set forth in claim 1, wherein said time stamp is comprised of a GPS time.

10. The position locating system as set forth in claim 1, wherein said satellite information provided by said server is comprised of a message, said message comprising a first field containing a value representing a time stamp affixed to said message by said server at a time said message is transmitted, and fields containing values representing satellite almanac, ephemerides, timing data, data representing velocity vectors of said satellites, data representing an indication of which of said satellites are in-view of said at least one base station, and data representing signal strengths of said coded signals from said in-view satellites.

11. The position locating system as set forth in claim 1, wherein said satellite positioning system is comprised of a GPS satellite positioning system and said predetermined number of satellites is comprised of at least four GPS satellites.

12. A method for determining a geographic location of a portable remote unit, the method comprising the steps of:

providing a communication system comprising at least one base station and a system controller, the at least one base station bi-directionally coupling the remote unit to the system controller through wireless links;

transmitting a message from the remote unit to the system controller through the at least one base station, the transmitted message including a time stamp;

in response to the transmitted message, requesting satellite information from a server coupled to the system controller, the server containing satellite information for a satellite positioning system;

in reply to the request, retrieving the requested satellite information from the server;

providing the retrieved satellite information to the remote unit; and acquiring a predetermined number of satellites of the satellite positioning system in accordance with the provided satellite information, wherein the acquired satellites provide coded signals for determining the geographic location of the remote unit;

wherein the step of retrieving the requested satellite information further comprises the steps of:

determining a time delay between the time stamp and time the message from the remote unit was received;

querying a satellite information database stored in a data store of the server using the time delay and the determined approximate location of the remote unit within the request for satellite information;

wherein the retrieved satellite information is comprised of the results of the database query.

13. The method for determining a geographic location of a portable remote unit as set forth in claim 12, wherein the communication system is comprised of a cellular telephone network.

14. The method for determining a geographic location of a portable remote unit as set forth in claim 13, wherein the communication infrastructure is comprised of the Internet which couples the cellular telephone network through a public switched telephone network (PSTN) to an Internet server.

15. The method for determining a geographic location of a portable remote unit as set forth in claim 10, wherein the step of transmitting a message from the remote unit further comprising the steps of:

determining an approximate location of the remote unit; and formatting the message to be transmitted to include the determined approximate location.

16. The method for determining a geographic location of a portable remote unit as set forth in claim 15, wherein when a latitude and a longitude of the at least one base station servicing the remote unit is known to the remote unit, the step of determining an approximate location of the remote unit is comprised of a step of assigning to the approximate location a value representing the known latitude and longitude of the at least one base station.

17. The method for determining a geographic location of a portable remote unit as set forth in claim 15, wherein when the latitude and the longitude of the at least one base station servicing the remote unit is not known to the remote unit, the step of determining an approximate location of the remote unit is comprised of a step of assigning to the approximate location a value representing a System ID (SID) of the communication system.

18. The method for determining a geographic location of a portable remote unit as set forth in claim 12, wherein the step of providing the retrieved satellite information further comprising the step of:

formatting a message comprising a first field containing a value representing a second time stamp affixed to the message by the server at a time the message is provided, and fields containing the results of the database query;

wherein the results of the database query include satellite almanac, ephemerides, timing data, data representing velocity vectors of said satellites, data representing an indication of which of said satellites are in-view of said at least one base station, and data representing signal strengths of said coded signals from said in-view satellites.

19. A wireless communication system, comprising:

a system controller;

at least one mobile station; and at least one base station for bi-directionally coupling said at least one mobile station to said system controller through wireless links;

wherein said system controller comprises an interface for relaying a message from said at least one mobile station to said communications network, said message including a time stamp, and for receiving a reply, in response to said message, from a satellite positioning data server that is coupled to said communication network, said reply being transmitted to said at least one mobile station to aid said at least one mobile station in acquiring positioning satellites; and wherein said server further comprises means for evaluating said time stamp to determine a time delay between said time stamp and a time said message from said mobile station was received, said server providing said satellite information in accordance with said time delay such that said provided satellite information represents said satellites at a time said provided satellite information is received at said mobile station.

20. The wireless communication system as set forth in claim 19, wherein said communications network is comprised of a communications network operating with TCP/IP network protocols.

21. A communication system, comprising:

a network;

a plurality of wireless service providers having a plurality of subscriber units, each of said plurality of service providers being bi-directionally coupled to said network; and a satellite positioning data server bi-directionally coupled to said network for replying to requests received from individual ones of said plurality of service providers for individual ones of said plurality of subscriber units, each of said requests including a message having a time stamp and providing an approximate geographical location of individual ones of said requesting subscriber units;

wherein said server further comprises means for evaluating said time stamp to determine a time delay between said time stamp and a time said message from said subscriber unit was received, said server providing said satellite information in accordance with said time delay such that said provided satellite information represents said satellites at a time said provided satellite information is received at said subscriber unit.

22. The communication system as set forth in claim 21, wherein said network is comprised of the Internet.

23. A position locating system for determining a geographic location of a communication unit, comprising:

a communications system comprising a central control station, said control station bi-directionally coupled to said communication unit; and a server coupled to said control station by a communication infrastructure external to said communications system, said server comprising a data store which contains satellite information for a satellite positioning system;

wherein in response to a message from said communication unit, said message including a time stamp, said server provides satellite information to said control station over said communication infrastructure such that said provided satellite information is passed to said communication unit;

wherein said provided satellite information comprises information to aid in acquiring a predetermined number of satellites, said acquired satellites providing coded signals for determining said geographic location of said communication unit; and wherein said server further comprises means for evaluating said time stamp to determine a time delay between said time stamp and a time said message from said communication unit was received, said server providing said satellite information in accordance with said time delay such that said provided satellite information represents said satellites at a time said provided satellite information is received at said communication unit.

24. The communication system as set forth in claim 23, wherein said communication infrastructure external to said communications system is comprised of the Internet.

25. A mobile radiotelephone, comprising:

a GPS receiver for receiving coded signals from a plurality of satellites, said coded signals for determining a geographic location of said mobile radiotelephone;

a telecommunication transmitter for transmitting a message from said mobile radiotelephone to a communication system, said message including a time stamp, said communication system coupled to a communication infrastructure external to said communication system;

a telecommunication receiver for receiving, in response to said transmitted message, satellite information from said external communication infrastructure through said communication system which aids said mobile radiotelephone in acquiring and receiving said coded signals from said plurality of satellites; and wherein said server further comprises means for evaluating said time stamp to determine a time delay between said time stamp and a time said message from said transmitter was received, said server providing said satellite information in accordance with said time delay such that said provided satellite information represents said satellites at a time said provided satellite information is received at said mobile radiotelephone.

26. The mobile radiotelephone as set forth in claim 25, wherein said satellite information from said external communication infrastructure is stored in a server coupled to said external communication infrastructure.

27. The mobile radiotelephone as set forth in claim 25, wherein said external communication infrastructure is comprised of the Internet.

28. The method for determining a geographic location of a portable remote unit as set forth in claim 11, wherein the server is coupled to the system controller by a communications infrastructure external to the communications system.

29. The wireless communications system as set forth in claim 19, wherein said interface is to an external communications network.

* * * * *